(12) United States Patent
Bähr et al.

(10) Patent No.: US 8,188,628 B2
(45) Date of Patent: May 29, 2012

(54) METHOD FOR MOUNTING AN ANGLE MEASURING DEVICE ON AN ELECTRIC MOTOR

(75) Inventors: Hubertus Bähr, Bad Königshofen (DE);
Rainer Eckert, Bad Neustadt/Herschfeld (DE); Udo Grossmann, Oberstreu (DE);
Hans-Joachim Müller, Burkardroth (DE)

(73) Assignee: Siemens Aktiengesellschaft, München (DE)

( * ) Notice: Subject to any disclaimer, the term of this patent is extended or adjusted under 35 U.S.C. 154(b) by 315 days.

(21) Appl. No.: 12/531,615

(22) PCT Filed: Mar. 13, 2008

(86) PCT No.: PCT/EP2008/052973
§ 371 (c)(1),
(2), (4) Date: Sep. 16, 2009

(87) PCT Pub. No.: WO2008/113735
PCT Pub. Date: Sep. 25, 2008

(65) Prior Publication Data
US 2010/0109490 A1    May 6, 2010

(30) Foreign Application Priority Data
Mar. 19, 2007    (DE) .......................... 10 2007 013 049

(51) Int. Cl.
*H02K 7/10*      (2006.01)
(52) U.S. Cl. .................... 310/75 D; 310/68 B; 310/112; 310/83
(58) Field of Classification Search ............... 310/68 B, 310/75 D, 112, 83
See application file for complete search history.

(56) References Cited

U.S. PATENT DOCUMENTS

| | | | | |
|---|---|---|---|---|
| 4,398,110 A | * | 8/1983 | Flinchbaugh et al. | 310/83 |
| 4,926,991 A | * | 5/1990 | Stone et al. | 192/41 S |
| 5,184,038 A | | 11/1992 | Hashimoto | |
| 5,631,511 A | * | 5/1997 | Schulmann et al. | 310/83 |
| 6,504,276 B2 | * | 1/2003 | Yamamura | 310/75 D |

FOREIGN PATENT DOCUMENTS

| | | |
|---|---|---|
| DE | 200 08 590 U1 | 10/2000 |
| EP | 0 115 538 A1 | 8/1984 |
| EP | 0 146783 A2 | 7/1985 |
| JP | 61 273146 A | 12/1986 |
| JP | 2001103709 A * | 4/2001 |
| JP | 2004169841 A * | 6/2004 |
| JP | 2005138733 A * | 6/2005 |
| JP | 2005155903 A * | 6/2005 |
| JP | 2006322466 A * | 11/2006 |

* cited by examiner

*Primary Examiner* — Quyen Leung
*Assistant Examiner* — Alex W Mok
(74) *Attorney, Agent, or Firm* — Henry M. Feiereisen; Ursula B. Day

(57) ABSTRACT

In order to connect an angle measuring device to a brushless direct-current motor, a coupling is used, the coupling halves (10, 28) of which are each attached to the rotor (46) of the motor and/or the rotor (42) of the angle measuring device. Instead of using a coupling that is rotationally symmetrical at arbitrary angular positions as in the prior art, a coupling is used in which the coupling halves (10, 28) can be connected to one another only in a finite number of relative angular positions. An adjustment must be made before the coupling halves (10, 28) are attached to the respective rotors (46, 52). This allows all subsequent adjustment to be omitted, for example, even for maintenance work.

3 Claims, 4 Drawing Sheets

METHOD FOR MOUNTING AN ANGLE MEASURING DEVICE ON AN ELECTRIC MOTOR

CROSS-REFERENCES TO RELATED APPLICATIONS

This application is the U.S. National Stage of International Application No. PCT/EP2008/052973, filed Mar. 13, 2008, which designated the United States and has been published as International Publication No. WO 2008/113735 and which claims the priority of German Patent Application, Serial No. 10 2007 013 049.1, filed Mar. 19, 2007, pursuant to 35 U.S.C. 119(a)-(d).

BACKGROUND OF THE INVENTION

The invention relates to a method for mounting an angle measuring device with a stator and a rotor on an electronic motor with a stator and a rotor. The invention also relates to a unit comprising an electric motor and an angle measuring device fastened thereto.

The task of the angle measuring device, which is also referred to as a rotary transducer, is to measure the relative position of the rotor of the motor with respect to the stator of the motor. For this purpose, the rotor of the angle measuring device is connected to the rotor of the motor, and the stator of the angle measuring device is connected to the stator of the motor. If in this case the relative relationship between the two rotors is known, the angle measuring device merely needs to measure the relative position between its own rotor and its own stator in order to be able to draw a conclusion regarding the relative position between the rotor of the motor and the stator of the motor. However, the problem consists precisely in the fact that the relative relationship between the two rotors needs to be known: in general a clutch comprising two clutch halves which can be connected to one another in any desired relative positions with respect to one another is used for connecting the rotors. Generally, the clutch half on the motor rotor has an inner cone, and the clutch half on the rotor of the angle measuring device has an outer cone. The outer cone precisely matches the inner cone. The inner cone and the outer cone are rotationally symmetrical with respect to rotations through any desired angle of between 0° and 360°. As a result of the clutch, a relative position of the two rotors with respect to one another is therefore not predetermined. In order to achieve a defined relative position of the two rotors in the prior art with respect to one another, the rotor of the angle measuring device is brought into a predetermined initial position with respect to the stator of the angle measuring device. The rotor of the motor then also needs to be brought into a defined position with respect to the stator of the motor, to be precise by suitable energization of the motor with predetermined signals. Then, the two clutch halves need to be connected to one another accurately. It is particularly disruptive that the adjustment of the two rotors and therefore of the two clutch halves with respect to one another needs to take place each time if the angle measuring device is separated from the motor. This may be required in the course of maintenance, and this maintenance is even made more difficult by the fact that the motor needs to be energized with predetermined signals each time in order that the rotor of the motor assumes a predetermined relative position with respect to the stator of the motor.

SUMMARY OF THE INVENTION

One object of the invention is to overcome the mentioned disadvantages of the prior art.

The object according to the invention is achieved by a method for mounting an angle measuring device with a stator and a rotor on an electric motor with a stator and a rotor therefore, which method comprises the following steps:
providing a clutch comprising a first clutch half and a second clutch half, which can be connected to one another exclusively in the case of a finite number of relative angular positions with respect to one another,
bringing the rotor of the motor into a defined relative position with respect to the stator of the motor,
attaching the first clutch half to the rotor of the motor,
bringing the rotor of the angle measuring device into a defined relative position with respect to the stator of the angle measuring device,
attaching the second clutch half to the rotor of the angle measuring device,
attaching the stator of the angle measuring device to the stator of the motor whilst at the same time connecting the first clutch half to the second clutch half.

The invention is based on the knowledge that it is more expedient to perform the adjustment prior to the attachment of the respective clutch half, and not after the attachment of the respective clutch half. This is made possible by the use of clutch halves which cannot be connected to one another in any desired angular positions. Instead, the number of relative angular positions of the clutch halves with respect to one another is limited, to be precise preferably such that, after the attachment of the clutch halves to the respect rotors, it is clear which of the relative angular positions with respect to one another the correct mounting position is. This is made possible, for example, by virtue of the fact that the relative angular positions in which the clutch halves can be connected to one another have an angular distance from one another of at least 15°. This angular distance is much greater than the adjustment accuracy.

The rotor of the motor is brought into a defined relative position with respect to the stator of the motor by virtue of defined energization of the motor, as in the prior art, but prior to the attachment of the first clutch half as described above.

The invention is also implemented by a unit comprising an electric motor, which is expediently a so-called brushless DC motor (also referred to as a servomotor), and an angle measuring device fastened on the electric motor. In the unit:
a first clutch half is mounted on a rotor of the motor,
a second clutch half is mounted on a rotor of the angle measuring device,
the clutch halves are connected to one another.

In contrast to the prior art, such a clutch half pair is used that can only be connected to one another in a finite number of relative angular positions.

BRIEF DESCRIPTION OF THE DRAWING

A preferred embodiment of the invention will be described below with reference to the drawing, in which.

DETAILED DESCRIPTION OF PREFERRED EMBODIMENTS

Figure 1:
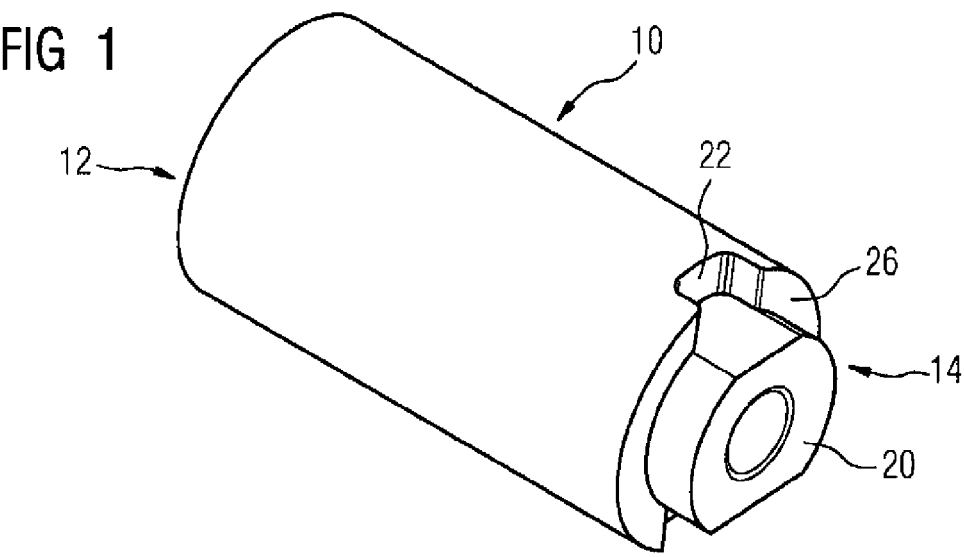
FIG. 1 shows a perspective view of a clutch half.
Figure 2:
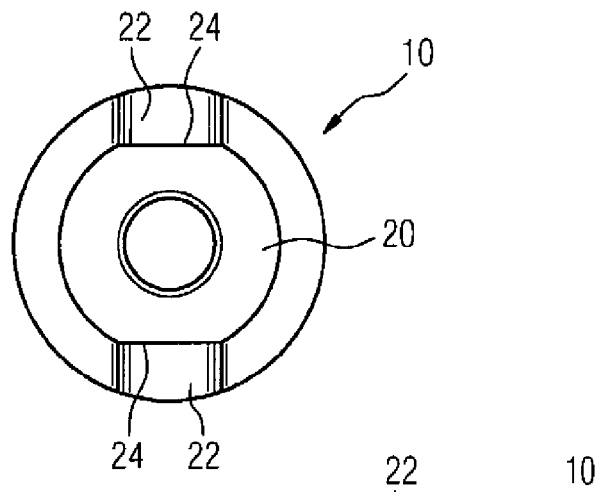
FIG. 2 shows a plan view of the clutch half shown in FIG. 1.
Figure 3:
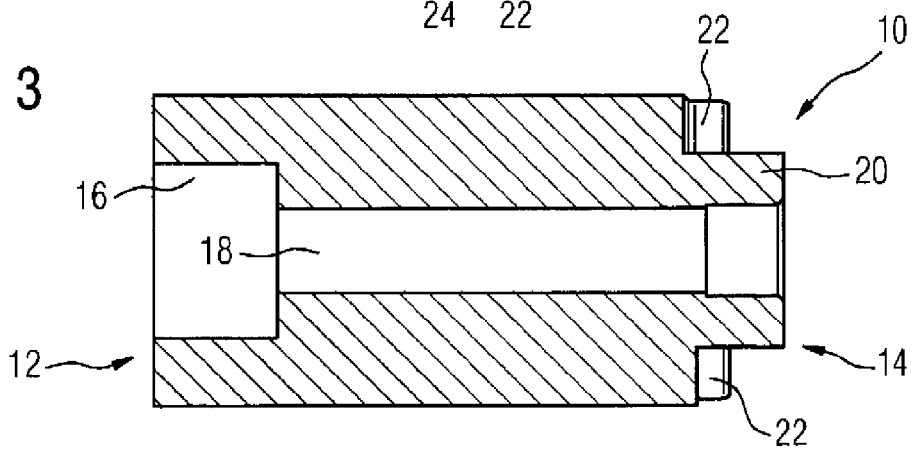
FIG. 3 shows a cross-sectional view of the clutch half shown in FIG. 1.

FIGS. 1 to 3 show a clutch half which overall is given the designation 10. The clutch half 10 can be connected to a rotor of an angle measuring device on a first side 12 and can be connected to a clutch half which matches, as the mating piece, the clutch half 10 on an opposite side 14. In order to be fastened on the rotor of the angle measuring device, the clutch half 10 has a cutout 16 on the side 12. A pin can be pushed through a passage 18. The side 14 of the clutch half 10 has both a male plug-type part 20 and a female plug-type part 22. The male plug-type part 20 in plan view has the form of a circle from which so much has been removed on mutually opposing sides that the plug-type part 20 has planar surfaces 24 on the mutually opposing sides. Precisely in the region of these surfaces 24, the female plug-type parts 22 are formed as cutouts in a casing 26 which surrounds the male plug-type part 20.

Figure 4:
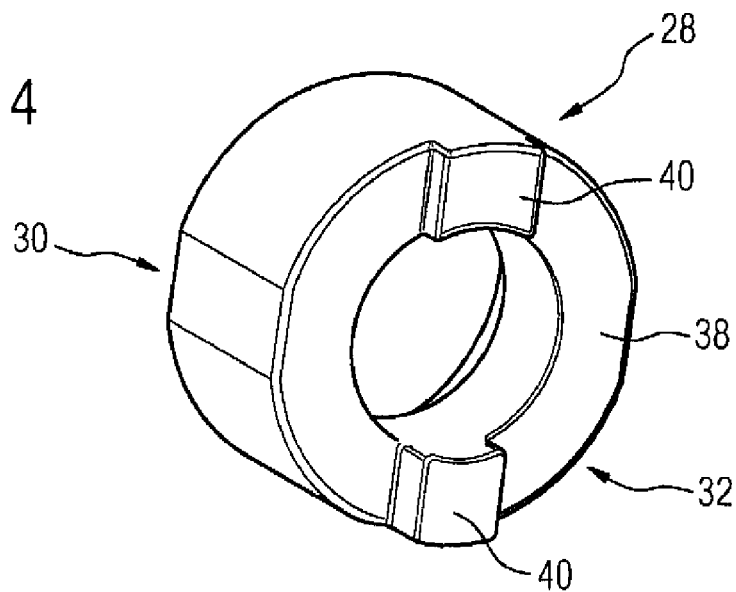
FIG. 4 shows a perspective view of the clutch half which is the mating piece for the clutch half shown in FIG. 1.
Figure 5:
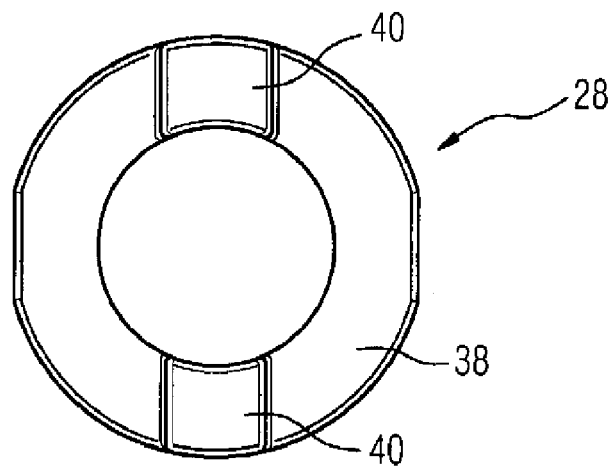
FIG. 5 shows a plan view of the clutch half shown in FIG. 4.
Figure 6:
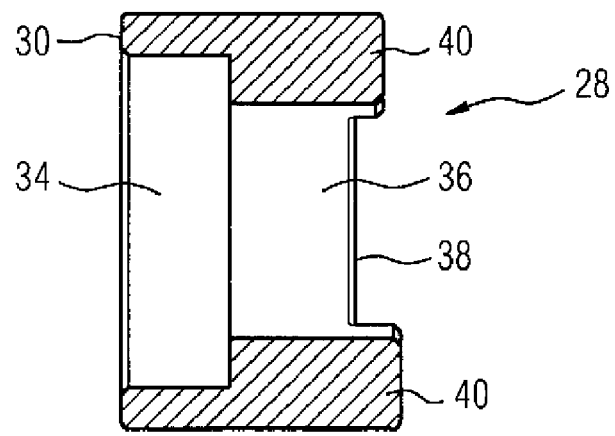
FIG. 6 shows a cross-sectional view of the clutch half shown in FIG. 4.

The mating piece with respect to the clutch half 10 is the clutch half which is shown in FIGS. 4 to 6 and which is overall denoted by 28. The clutch half 28 can be connected to the rotor of a motor on one side 30 and can be connected to the clutch half 10 on the opposite side 32. A cutout 34 is provided on the side 30 and can be used to plug the clutch half 28 onto the rotor of the motor. The cutout 34 is adjoined by a channel 36 for a pin. An annular surface 38 whose inner diameter matches the male plug-type part 20 of the clutch half 10 is formed on the side 32 of the clutch half 28: the circular form forming the basis for the form of the male plug-type part 20 fits precisely into the inner diameter of the annular surface 38. Pins 40 are formed on two mutually opposite points on the annular surface 38. The pins 40 are male plug-type parts which precisely match the female plug-type parts 22 of the clutch half 10.

Figure 7:
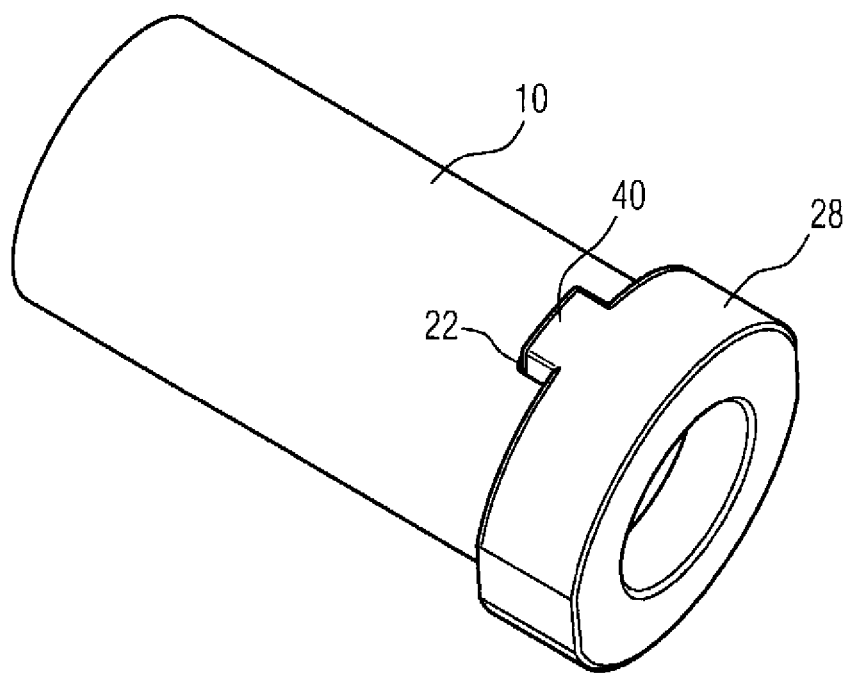
FIG. 7 shows a perspective view of the clutch with the clutch halves connected to one another.
Figure 8:
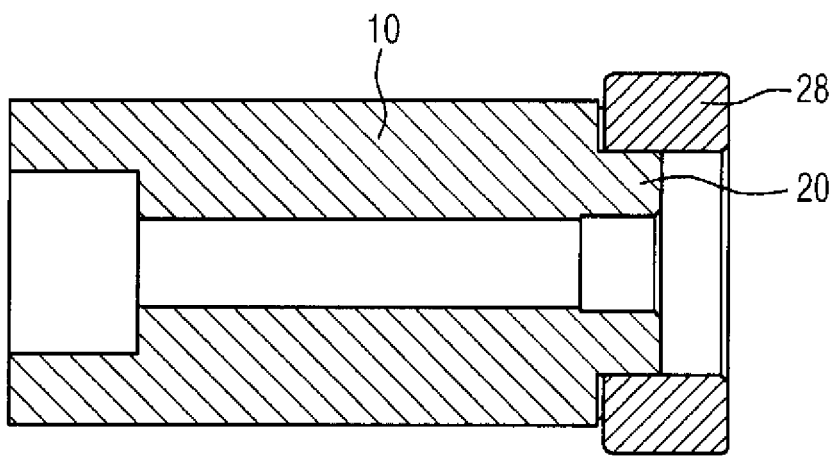
FIG. 8 shows a cross-sectional view of the clutch shown in FIG. 7 in a first plane.
Figure 9:
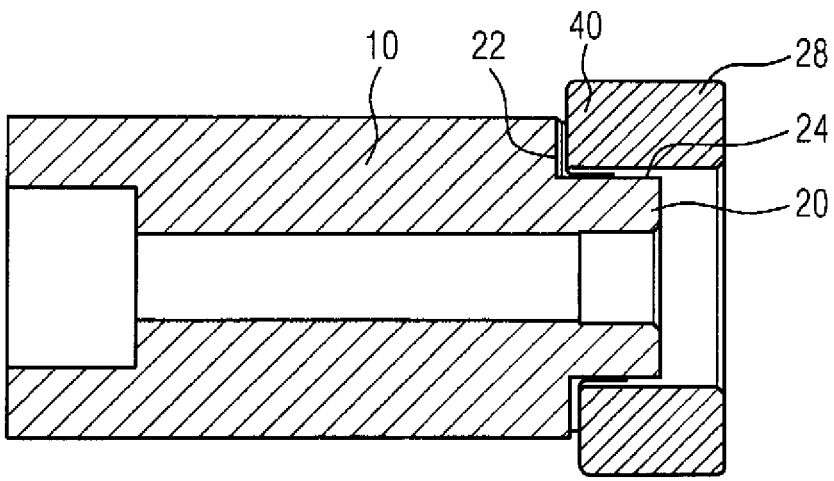
FIG. 9 shows a cross-sectional view of the clutch shown in FIG. 7 in a plane perpendicular to the first plane.

FIGS. 7 to 9 show the clutch halves 10 and 28 in the interconnected state. The male plug-type part 20 of the clutch half 10 engages in the inner ring of the clutch half 28 and at the same time the male plug-type part 40 of the clutch half 28 engages in the female plug-type part 22 of the clutch half 10. While FIG. 8 shows that where the male plug-type part 20 has the annular contour, it precisely touches the inner ring of the clutch half 28, FIG. 9 shows that as a result of the formation of the surfaces 24 by deviation from the annular contour of the male plug-type part 20, a distance with respect to the inner ring of the clutch half 28 is produced, which does, however, assist in the holding of the male plug-type part 40 in the female plug-type part 22.

Figure 10:
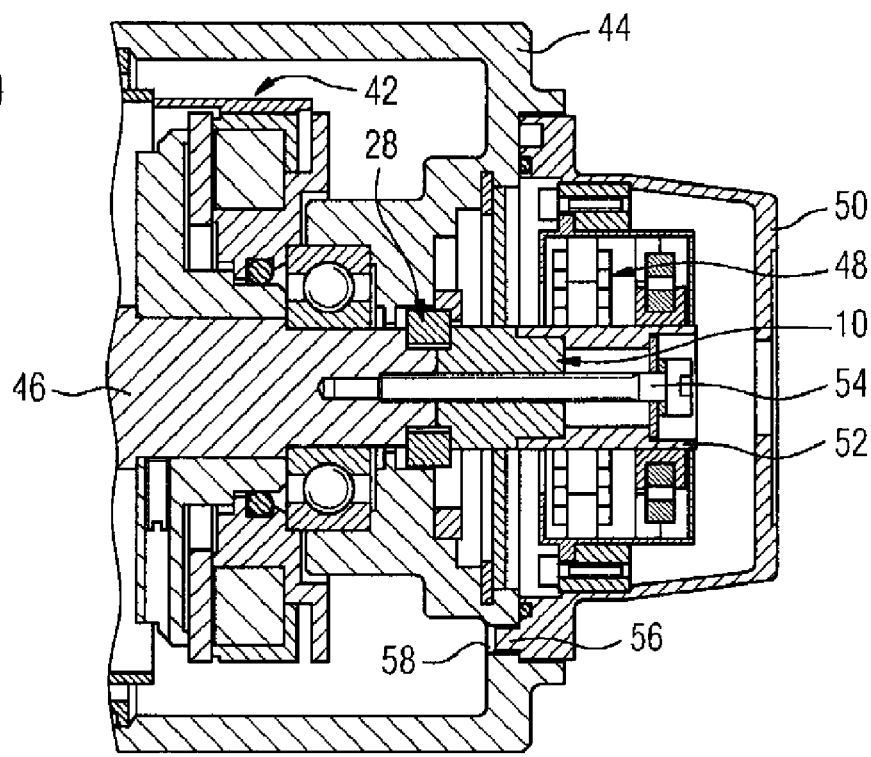
FIG. 10 shows a cross-sectional view of a unit comprising an electric motor and an angle measuring device fastened thereto in a first plane.
Figure 11:
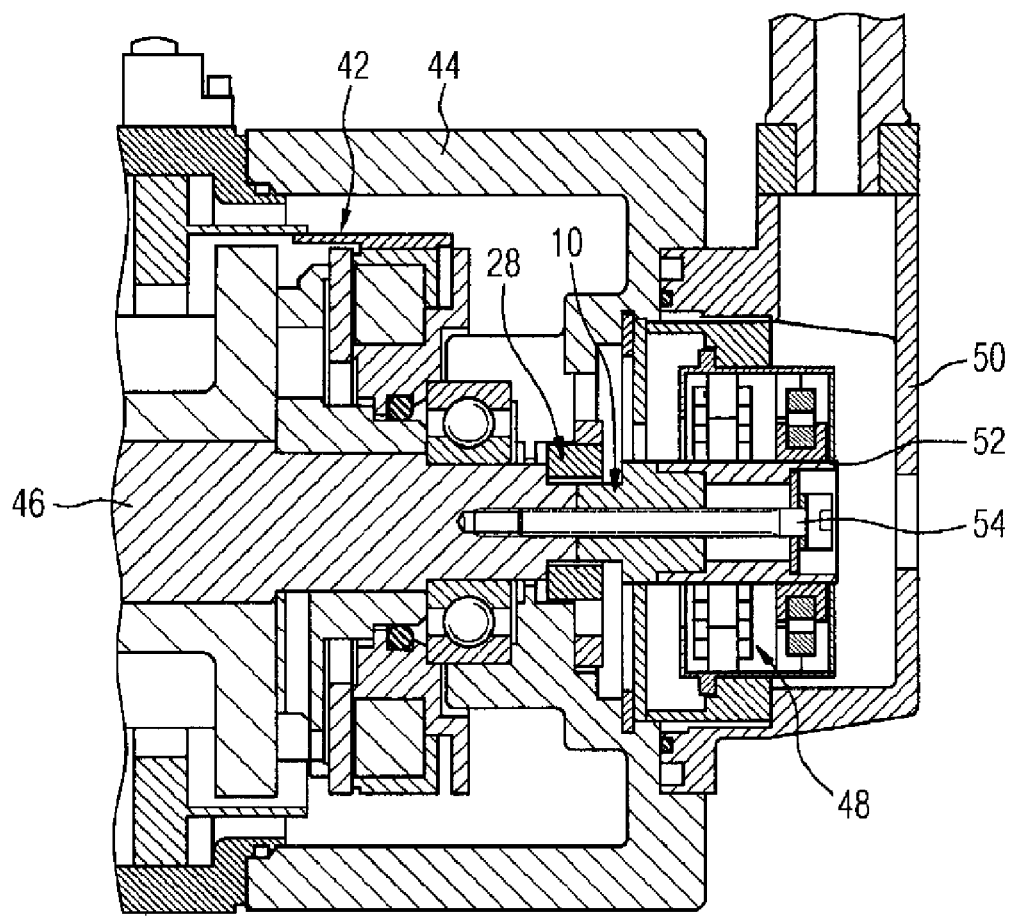
FIG. 11 shows a cross-sectional view of the unit shown in FIG. 10 in a plane perpendicular to the first plane.

FIGS. 10 and 11 show the clutch in use in the context of the present invention. An angle measuring device, which is shown on the right in FIGS. 10 and 11, is fastened on an electric motor, which is shown on the left in FIGS. 10 and 11. The motor has a stator 42 with the housing 44, in which a shaft 46 rotates. The angle measuring device has a stator 48 with the housing 50, in which a rotor 52 (shaft) rotates. The clutch half 10 is fastened on the rotor 52 of the angle measuring device, with a pin 54 engaging through the channel 18 into a cutout of the rotor 46 of the motor. The clutch half 28 is fastened on the rotor 46, and the clutch halves 10 and 28 are connected to one another. The illustration shown in FIG. 10 corresponds, with the sides reversed, to the clutch half 10 and 28 in FIG. 8, and the illustration shown in FIG. 11 corresponds to FIG. 9.

In contrast to the prior art, the two clutch halves 10 and 28 cannot be connected to one another in any desired angular positions, but only in two angular positions with rotational symmetry in the case of a rotation through 180°. Correspondingly, when the clutch halves 10 and 28 are mounted on the respective rotors 52 and 46, an adjustment is necessary even at this stage. Then, the rotor 52 of the angle measuring device is brought in advance into a predetermined angular position relative to the stator 48, before the clutch half 10 is mounted. The motor is energized in such a way that the rotor 46 assumes a predetermined relative angular position with respect to the stator 42. If the clutch halves 10 and 28 are mounted correctly, the angle measuring device accurately fits on the motor, to be precise the housing 50 of the angle measuring device directly matches the housing 44 of the motor if the clutch halves 10 and 28 are connected to one another. By way of example, reference is made to a connecting pin 56, which is formed on the housing 50 of the angle measuring device. The pin 56 fits accurately into a cutout 58 in the housing 44 of the motor. Although it is not self evident in the prior art that the housings 50 and 44 match one another precisely, the fact that the clutch halves 10 and 28 are mounted after a prior adjustment makes it possible for such a pin 56 and a cutout 58 to be provided which are precisely mating pieces with respect to one another.

What is claimed is:

1. A method for mounting an angle measuring device with a stator and a rotor on an electric motor with a stator and a rotor, said method comprising the steps of:
   providing a clutch comprising a first clutch half and a second clutch half which are connectable to one another exclusively in the presence of a finite number of relative angular positions with respect to one another;
   moving the rotor of the electric motor into a defined relative position with respect to the stator of the electric motor;
   attaching the first clutch half to the rotor of the electric motor;
   moving the rotor of the angle measuring device into a defined relative position with respect to the stator of the angle measuring device;
   attaching the second clutch half to the rotor of the angle measuring device; and
   attaching the stator of the angle measuring device to the stator of the motor whilst at the same time connecting the first clutch half to the second clutch half.

2. The method of claim 1, wherein the relative angular positions in which the first and second clutch halves are connectable to one another have an angular distance from one another of at least 15°.

3. The method of claim 1, wherein the rotor of the electric motor is brought into a defined relative position with respect to the stator of the electric motor by virtue of a defined energization of the electric motor.

* * * * *